United States Patent
Tsiatsis et al.

(10) Patent No.: US 9,913,074 B2
(45) Date of Patent: Mar. 6, 2018

(54) IDENTIFYING RESOURCES FROM A DEVICE IN A COMMUNICATIONS NETWORK

(71) Applicant: Telefonaktiebolaget L M Ericsson (publ), Stockholm (SE)

(72) Inventors: Vlasios Tsiatsis, Solna (SE); Jari Arkko, Kauniainen (FI); Ryoji Kato, Kanagawa (JP); Sébastien Pierrel, Sundbyberg (SE); Jakob Saros, Solna (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 80 days.

(21) Appl. No.: 14/894,531

(22) PCT Filed: May 31, 2013

(86) PCT No.: PCT/SE2013/050629
§ 371 (c)(1),
(2) Date: Nov. 29, 2015

(87) PCT Pub. No.: WO2014/193282
PCT Pub. Date: Dec. 4, 2014

(65) Prior Publication Data
US 2016/0119740 A1    Apr. 28, 2016

(51) Int. Cl.
*H04L 29/08*  (2006.01)
*H04W 4/00*  (2009.01)

(52) U.S. Cl.
CPC ......... *H04W 4/006* (2013.01); *H04L 67/1002* (2013.01); *H04L 67/1095* (2013.01); *H04L 67/28* (2013.01); *H04W 4/005* (2013.01)

(58) Field of Classification Search
None
See application file for complete search history.

(56) References Cited

U.S. PATENT DOCUMENTS

2013/0166755 A1*  6/2013  Sasin ............... H04W 4/005
                                                    709/226
2013/0198340 A1*  8/2013  Ukkola ............ H04L 67/02
                                                    709/219

(Continued)

FOREIGN PATENT DOCUMENTS

WO     2013071949 A1     5/2013

OTHER PUBLICATIONS

Perelman, V. et al., "Network Configuration Protocol for Constrained Devices (NETCONF Light)", Network Working Group, Internet-Draft, Intended status: Informational, draft-schoenw-netconf-light-00, Jun. 4, 2011, pp. 1-12.

(Continued)

*Primary Examiner* — Chi H Pham
*Assistant Examiner* — Soon-Dong D Hyun
(74) *Attorney, Agent, or Firm* — Murphy, Bilak & Homiller, PLLC

(57) ABSTRACT

A method and apparatus for identifying resources available at a device in a communication network. A Resource Directory Proxy node receives a first message from the device. The first message relates to a change in at least one resource available at the device. The Resource Directory Proxy then sends, to a Resource Directory node selected from a set of Resource Directory nodes, a second message. The second message includes the change in the at least one of the resources available. There is also provided a method and apparatus for providing data from the device is provided. A Mirror Proxy Proxy node receives from the device a data message that includes an identity of the device and data obtained by the device. The Mirror Proxy Proxy node selects, from a set of Mirror Proxy nodes, a Mirror Proxy node, and sends to the selected Mirror Proxy node a further (Continued)

data message, the further data message including the identity of the device and the data obtained by the device.

4 Claims, 6 Drawing Sheets

(56) References Cited

U.S. PATENT DOCUMENTS

| | | | | |
|---|---|---|---|---|
| 2013/0212215 A1* | 8/2013 | Ukkola | ............... | H04L 67/02 709/217 |
| 2014/0242952 A1* | 8/2014 | Zhang | ............... | H04W 4/005 455/411 |
| 2014/0359131 A1* | 12/2014 | Seed | ............... | H04L 47/125 709/226 |
| 2015/0327112 A1* | 11/2015 | Kant | ............... | H04W 28/0263 370/230 |
| 2016/0056996 A1* | 2/2016 | Anand | ............... | G06F 11/2025 370/221 |

OTHER PUBLICATIONS

Shelby, Z. et al., "Constrained Application Protocol (CoAP)", CoRE Working Group, Internet-Draft, Intended status: Standards Track; draft-ietf-core-coap-07, Jul. 8, 2011, pp. 1-86.

Shelby, Z. et al., "CoRE Resource Directory", CoRE Internet-Draft, Intended status: Standards Track, draft-shelby-core-resource-directory-05, Feb. 25, 2013, pp. 1-27.

Vial, M., "CoRE Mirror Server", CoRE Internet-Draft, Intended Status: Standards Track; draft-vial-core-mirror-server-01, Apr. 10, 2013, pp. 1-20.

* cited by examiner

IDENTIFYING RESOURCES FROM A DEVICE IN A COMMUNICATIONS NETWORK

TECHNICAL FIELD

The present invention relates to the field of providing resources from a device in a communications network.

BACKGROUND

Communications devices, such as mobile telephones or personal computers, allow a subscriber to attach to a communication network and communicate with other devices. Furthermore, a growth area is that of machine to machine (M2M) communication, in which communications are sent between different devices without human intervention. Examples of the use of M2M communication include sensor networks (for example, networks for monitoring weather conditions), surveillance equipment (for example alarm systems, video monitoring, and so on), vehicle fleet management, vending machines, monitoring manufacturing and so on.

It is predicted that in the long term future, there will be billions of M2M devices, and the number of M2M devices will far exceed the number of devices used for communication between humans (such as mobile telephones, personal computers and so on).

M2M devices may include actuators in order for the M2M device to receive an instruction and act upon the instruction. There are many uses of M2M devices, and they can potentially consume a lot of network resources.

A typical feature of such devices is that they have limited energy resources, and so are termed "energy constrained". Energy is consumed when the device is activated and communicates with a network, and takes readings or operates an actuator. It is advantageous to limit the amount of energy used by the device and to minimise any unnecessary use of energy in order to prolong the useful life of the device.

Energy constrained sensor and actuator devices typically register their resources and capabilities thereof to directory services (e.g. the IETF CoRE Resource Directory or RD for short in the rest of the text) for the purposes of reachability, discoverability by applications and inventory maintenance. A Resource Directory (RD) is required because the devices may often be in a sleep mode or in a network where multicast traffic is inefficient. An RD hosts descriptions of resources held on other servers which allows applications to look up available resources. A device may register with one or more RDs. The RD maintains all the metadata that describe the sensor and the produced data.

Devices can also benefit from the existence of a data cache service where they push the current sensor resource representations (e.g. the IETF CoRE Mirror Proxy). A Mirror Proxy (MP) allows applications to obtain the data pushed to the MP without contacting the device. The MP maintains the last known snapshot of the sensor data, e.g. the last vibration measurement for an industrial motor, which is refreshed periodically.

The use of RDs and MPs allows applications to obtain information from the device while eliminating the need for the device to remain in full power mode at all times, which would otherwise deplete the device's energy resources. The RD 2 and the MP 3 also protect the device 1 from Denial of Service (DoS) attacks.

FIG. 1 illustrates an exemplary network in which a device 1 registers with a RD 2 and pushes data to a MP 3. Applications 4, 5, 6 can query the RD 2 and the MP 3 directly without needing to contact the device 1. The dashed lines in FIG. 1 represent resource description related messages (registrations, queries), while the solid lines represent data access related messages. The placement of these functions in the topology of a network can vary. For example the RD 2 may be placed on a sensor gateway (e.g. building GW) or in the cloud. The RD 2 and the MP 3 may be co-located at one node or separately located at different nodes.

A type of network in which a device 1 communicates with RDs 2 and MPs 3 may require the device 1 to send multiple messages to RDs with registration information and sensor data to multiple MPs. This is also the case for devices that may run multiple applications from different stakeholders. While the example of FIG. 1 shows one device 1 registration to one RD 2, and one MP 3, the device may need to register with several RDs and push data to several MPs.

The device 1 (and applications 4, 5, 6) must initially perform discovery to determine the existence of at least one RD 2. The discovery of one or more MPs 3 can be done by the use of the RD 2 itself since, in the IETF architecture, the MP 3 is considered as another resource. Although the RD 2 is also considered in IETF as another resource, there is currently no solution for the device 1 to discover the RD 2.

A further problem arises in the case where the device 1 must communicate with multiple RDs and MPs. A device may be required to register with multiple RDs and push its data to multiple MPs in order to provide load balancing in the network, or for commercial reasons (for example, if multiple network operators are involved). If application developers would like to discover any resource and access any resource representation regardless of the telecom operator they are cooperating with, a network support function must be provided that allows the applications 4, 5, 6 to perform resource discovery and have resource access across different domains.

In the case where there are multiple RDs and MPs, the device 1 must initiate multiple registration requests to multiple RDs and push its data to multiple MPs assuming a full replication policy. Moreover, if the device 1 includes a multi-sensor platform (e.g. it has sensors for different conditions, e.g. light, temperature etc.), the device's 1 resource description includes all of the primitive sensor modalities and the MP 3 would need to maintain all the sensor resources corresponding to the different modalities. For reasons of load balancing on the network, there may be a need for dedicated MPs for specific sensor modalities (e.g. electricity meter readings only and not device management information). Communication with multiple RDs and MPs further drains the energy resources of the device 1.

SUMMARY

An object is to improve the conservation of energy of constrained devices that communicate with multiple Resource Directories and/or Mirror Proxies.

According to a first aspect, there is provided a method of identifying resources available at a device in a communication network. A Resource Directory Proxy node (RDP) receives a first message from the device. The first message relates to a change in at least one resource available at the device. The RDP then sends, to a Resource Directory (RD) node selected from a set of RD nodes, a second message. The second message includes the change in the at least one of the resources available. An advantage of this is that the RDP node can receive a message from a device and select one or more RDs on behalf of the device. This reduces signalling from the device when a change in a resource occurs, thereby conserving energy resources at the device.

As an option, prior to receiving the first message, the RDP receives from the device a third message. The third message identifies the device and includes information identifying resources available. The RDP selects the RD node from the set of RD nodes and sends to the RD node a fourth message. The fourth message identifies the device and the available resources. The fourth message is optionally sent to a plurality of RD nodes. As a further option, the fourth message includes an identity of at least one Mirror Proxy Proxy (MPP) node to which the device sends data. An advantage of this is that it allows easier provisioning of the identity RDP at the device rather than requiring provisioning the identities of many RDs at the device As an option, the RDP node stores data relating to the change in at least one of the resources available at the device.

The first message optionally comprises information relating to changes in at least a first resource and a second resource. In this case, a message is sent to a first RD relating to a change in the first resource, and a further message is sent to a second RD relating to a change in the second resource. Again, this reduces signalling that the device must send, thereby conserving energy resources.

The RDP optionally sends to the device a presence request message to determine the availability of the device.

According to a second aspect, there is provided a method of identifying resources available at a device in a communication network. The device sends to a RDP node a first message, the first message identifying the device and including information identifying changes to at least one resource available at the device. The information can then be sent from the RDP node to at least one RD node selected from a set of RD nodes. This has the advantage of the device only needing to send one message rather than several, thereby conserving energy resources at the device.

As an option, prior to sending the first message to the RDP node, the device sends to the RDP node an identifying message identifying the device and information identifying the resources available. As a further option, prior to sending the identifying message, the device receives from a Gateway node to which the device is attached a message identifying the RDP node. This has the advantage of informing the device of the identity of the RDP node, thereby removing the requirement of provisioning the identity of the RDP node at the device.

The identifying message optionally includes an identity of at least one MPP node to which the device sends data.

The method optionally comprises receiving from the RDP node a presence request message to determine the availability of the device.

The device optionally sends to a MPP node data relating to at least one of the resources available at the device, enabling the MPP node to make the data available to at least one Mirror Proxy (MP) node.

According to a third aspect, there is provided a method of providing data from a device to a MP node in a communication network. A MPP node receives from the device a data message. The data message includes an identity of the device and data obtained by the device. The MPP node selects, from a set of MP nodes, a MP node, and sends to the selected MP node a further data message, the further data message including the identity of the device and the data obtained by the device. This has the advantage of conserving energy resources at the device, as it only needs to send data to one MPP node rather than potentially several MP nodes.

An additional data message is optionally sent to a further MP node. As a further option, the MPP node receives from the device a first set of data and a second set of data. For the first set of data, the MPP determines an identity of a MP node to receive the first set of data. For the second set of data, the MPP determines an identity of a further MP node to receive the second set of data. Each set of data is sent to the respective determined MP node. This has the advantage of allowing more than one set of data to be sent by the device in a single message, and the MPP node can select the relevant MP node to receive each set of data. Again, this conserves energy resources at the device.

According to a fourth aspect, there is provided a RDP node that is provided with a receiver for receiving from a device a first message. The first message relates to a change in at least one resource available at the device. A processor is provided for selecting, from a set of RD nodes a RD node associated with the device. A transmitter is provided for sending to the selected RD node a second message including the change in the at least one resource available at the device.

As an option, the receiver is further arranged to receive from the device a third message, the third message identifying the device and including information identifying resources available. The transmitter is arranged to send to the RD node a fourth message, the fourth message identifying the device and the available resources. As a further option, the transmitter is arranged to send a fifth message to a further RD node, the fifth message identifying the device and at least a part of the available resources.

The transmitter is optionally arranged to send in the second message an identity of at least one MPP node to which the device sends data.

According to a fifth aspect, there is provided a device for use in a communications network. The device is provided with a data generating unit and a processor for collecting data from the data generating unit. A first transmitter is provided for sending to a RDP node a first message. The first message identifies the device and includes information identifying any of resources available and changes to at least one resource, the information to be sent from the RDP node to at least one RD node selected from a set of RD nodes. A second transmitter is provided for sending to a MPP node at least a portion of the data collected by processor, enabling the MPP node to make the data available to at least one MP node.

Optional examples of a data generating unit include a sensor and an actuator.

The device is optionally provided with a receiver for receiving from the RDP node a presence request message to determine the availability of the device.

According to a sixth aspect, there is provided a MPP node for use in a communication network. The MPP node is provided with a receiver for receiving from a device a data message. The data message includes an identity of the device and data obtained by the device. A processor is provided for selecting from a set of MP nodes a MP node. A transmitter is also provided for sending to the selected MP node a further data message, the further data message including the identity of the device and at least a portion of the data obtained by the device.

The transmitter is optionally arranged to send an additional data message to a further MP node. As a further option, the receiver is arranged to receive from the device at least two sets of data. The MPP node further comprises a processor arranged to, for each set of data, determine an identity of a MP node to receive the set of data. The transmitter is arranged to send the set of data to the determined MP node.

According to a seventh aspect, there is provided a computer program comprising computer readable code which, when run on a RDP node causes the RDP node to perform the method described above in the first aspect.

According to an eighth aspect, there is provided a computer program comprising computer readable code which, when run on a device, causes the device to perform the method described above in the second aspect.

According to a ninth aspect, there is provided a computer program comprising computer readable code which, when run on a MPP node, causes the MPP node to perform the method described above in the third aspect.

According to a tenth aspect, there is provided a computer program product comprising a non-transitory computer readable medium and a computer program as described above in any of the seventh, eighth or ninth aspects. The computer program is stored on the non-transitory computer readable medium.

According to an eleventh aspect, there is provided a vessel or vehicle comprising any of a RDP node as described above in the fourth aspect, a device as described above in the fifth aspect, and a MPP node as described above in the sixth aspect.

DETAILED DESCRIPTION

The following description assumes that the network uses IETF CoRE (Constrained RESTful Environments) technology to control the communication between devices (such as M2M devices or Internet of Things objects) and the network. However, it will be appreciated that the techniques may be easily adapted to other types of communication network.

Figure 1:
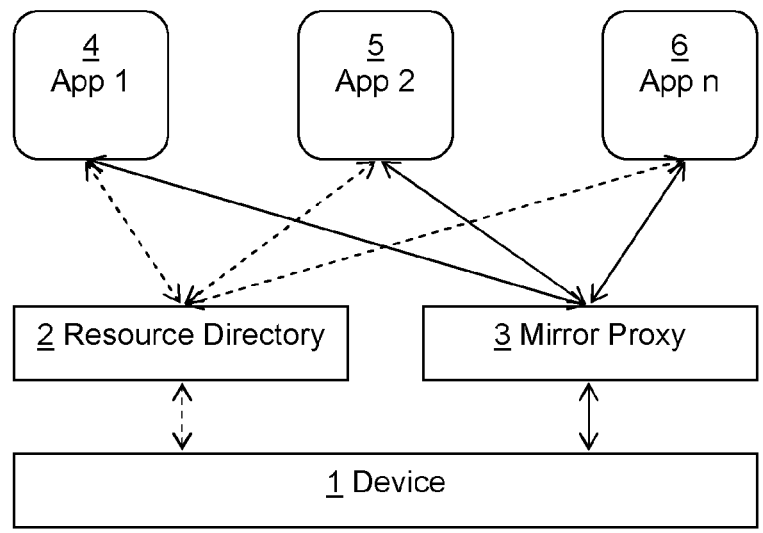
FIG. 1 illustrates schematically in a block diagram an exemplary communications network.
Figure 2:
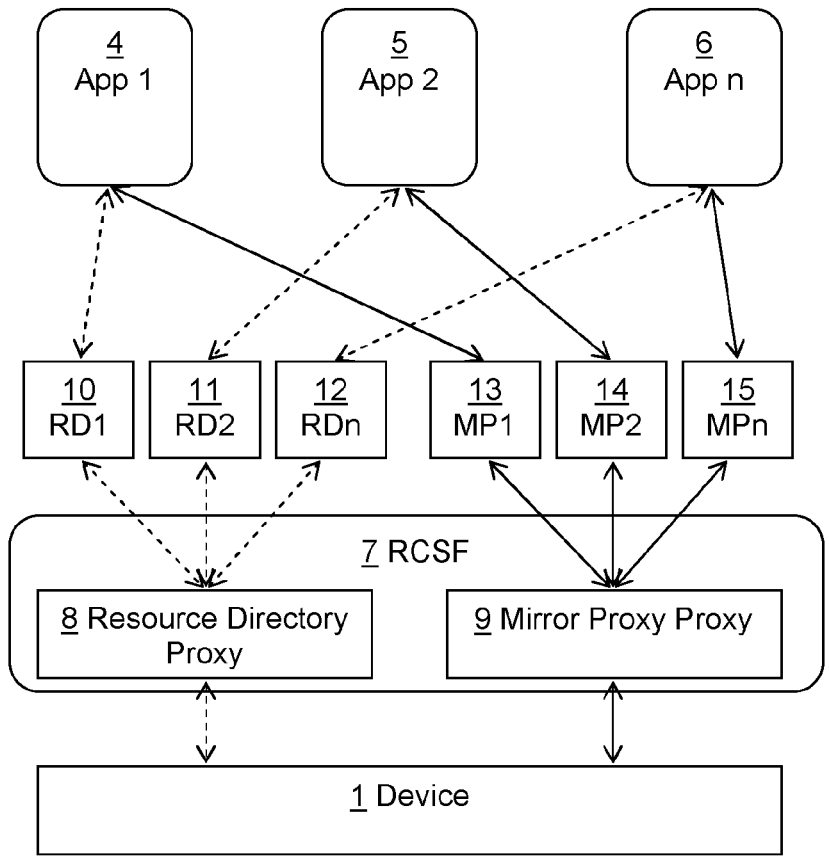
FIG. 2 illustrates schematically in a block diagram an exemplary communications network using proxy nodes.

FIG. 2 shows an exemplary network. In addition to the device 1 and applications 4, 5, 6, a Registration and Caching Support Function (RCSF) 7 is provided. The RCSF 7 includes a Resource Directory Proxy (RDP) 8 and a Mirror Proxy Proxy (MPP) 9. The device 1 communicates directly with the RDP 8 and the MPP 9. A plurality of RDs 10, 11, 12 is shown. These RDs 10, 11, 12 communicate with the RDP 8, and can be queried by the applications 4, 5, 6. A plurality of MPs 13, 14, 15 is also shown that communicate with the MPP 9 and can also be queried by the applications 4, 5, 6.

The RDP 8, in an exemplary embodiment, resides on a node that is directly reachable by the device 1 and is responsible for two functions. The first function is to maintain information about the responsible RD(s) 10, 11, 12 that the device 1 is expected to register with, and information about the MPP 9 to which the device 1 sends data. Information may include information relating to format adaptation and, in the case of the RDs 10, 11, 12 reachability information (such as an IP address). It will be appreciated that other types of information may be maintained. The second function of the RDP 8 is to receive a single registration message from the device 1 and update the necessary RDs 10, 11, 12 according to a policy provisioned using a provisioning agent.

The RDP 8 can update the individual RDs 10, 11, 12 periodically if the RD registrations are in a soft state. This means that the device 1 does not need to register separately with multiple RDs 10, 11, 12. The RDP 8 also checks the presence of the device 1 (this may be performed using 3GPP mechanisms if the connectivity between the RDP 8 and device 1 is a 3GPP one). Furthermore, the RDP 8 splits a multi-sensor resource registration (i.e. where a single device has multiple sensors, each sensor of which must be registered with a different RD) to multiple single resource registrations to different RDs. An additional function that an RDP 8 may perform is any necessary format adaptation between a device provided resource description (source description) and the recipient RD resource description (target description).

The MPP 9 provides a single node to which the device 1 sends data. The MPP 9 then updates different MPs 13, 14, 15 for load balancing purposes. The MPP 9 also splits multi-sensor data to individual sensor data, and sends the data to the corresponding and relevant MPs. Sensor data originating from a sensor can also be adapted by the MPP 9 to match the required format by each individual MP 13, 14, 15.

By allowing the device 1 to register with an RDP 9 instead of many RDs 10, 11, 12 discovery of an RD by the device becomes easier. For example, the device 1 can be pre-provisioned with the identity of the RDP 9 with which it will register. Furthermore, energy is conserved because only one registration procedure between the RDP 9 and the device 1 is required, which requires much less energy than performing multiple registration procedures between the device 1 and several RDs 10, 11, 12. Similarly, by providing a single MPP 9 to which the device 1 sends data, device energy is conserved because the data need only be sent to the MPP 9 rather than to a plurality of MPs 13, 14, 15.

A device resource can be considered to be anything that has a digital representation and can be exposed to applications that read and modify this representation. A resource need not correspond to a physical resource. It may be, for example, a software program offering an application programming interface (API). An example of a resource is a temperature resource corresponding to a real temperature sensor provided at the device 1, and its representation is the temperature value in degrees Celsius. Another example of a resource is a counter of lost packets transmitted over a wireless channel. The skilled person may envisage many different types of resource that can be provided by the device 1.

Figure 3:
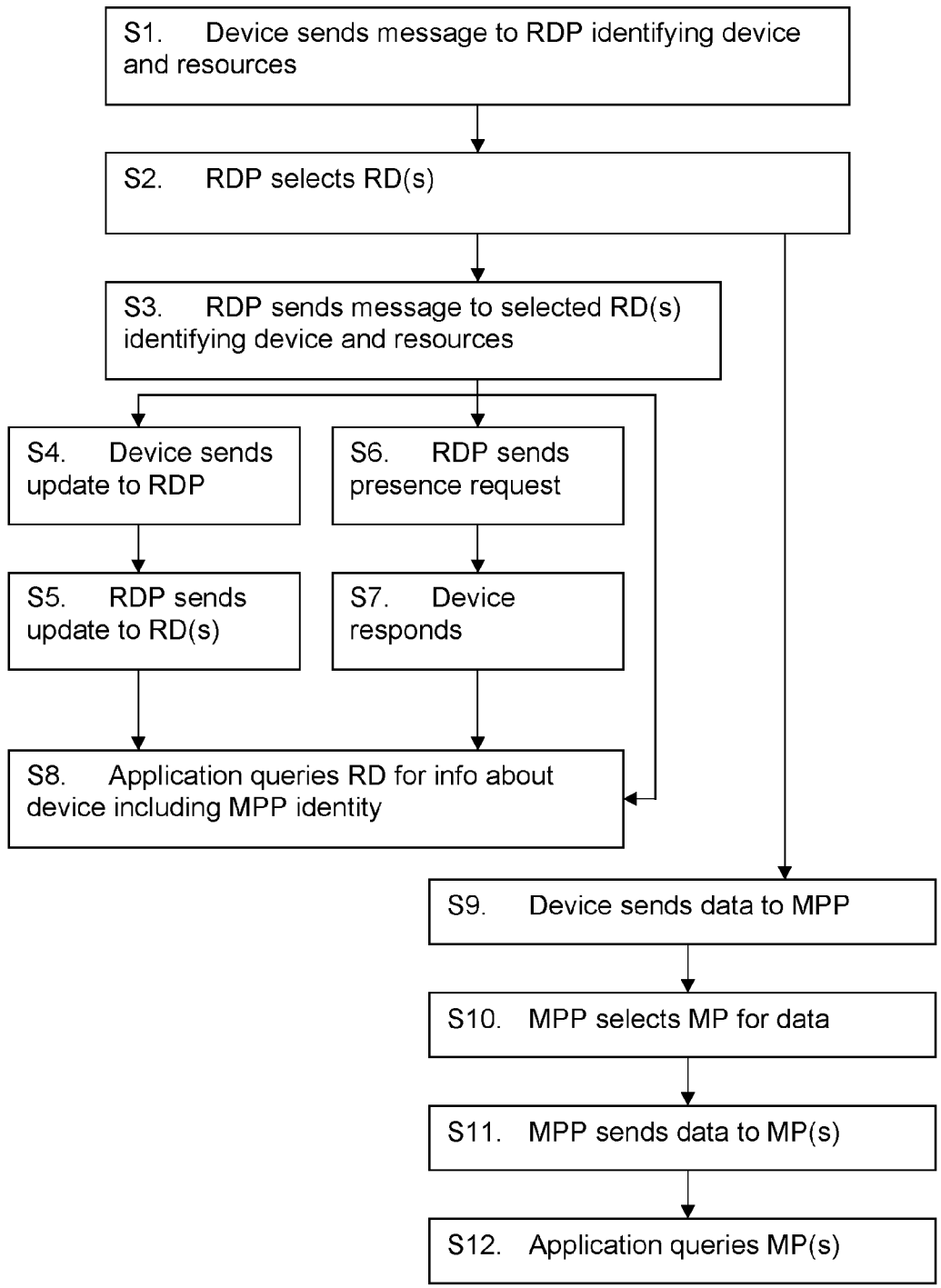
FIG. 3 is a flow diagram showing steps of exemplary embodiments.

Various embodiments are illustrated in FIG. 3. The following numbering corresponds to that of FIG. 3:

S1. The device 1 sends a message to the RDP 8 that identifies the device 1 and its resources available from a data generating unit (for example, the sort of sensor data it can collect, the frequency of updates it will provide, the format of the data and so on). The message may also identify the MPP 9 or the MPs 13, 14, 15 to which the device 1 will send data.

S2. The RDP 8 determines which RDs 10, 11, 12 require the information identifying the device and its resources.

S3. The RDP 8 sends the information to the determined RDs 10, 11, 12.

S4. In an embodiment, the resources available from the device 1 may change (for example, the device firmware may be updated, exposing more device resources). In this case, the device 1 sends updated resource information to the RDP 8.

S5. The RDP 8 sends the updated information to the RDs 10, 11, 12 that require the information.

S6. In an embodiment, the RDP 8 may send a presence request to the device 1 to determine its availability.

S7. The device 1 responds to the presence request.

S8. Once the RDs 10, 11, 12 are provisioned with the identity of the device 1 and the resource information, applications 4, 5, 6 can query the RDs 10, 11, 12.

S9. Once the device 1 has registered with the RDP 8, it can start sending data that it collects to the MPP 9. Note that the data may be sent by pushing, or the device 1 may send the data in response to a trigger. In the case where the device 1 is configured to push data, the MPP 9 may act as a temporary cache to store data before it establishes the identities of the relevant MPs 13, 14, 15.

S10. The MPP 9 determines which MPs 13, 14, 15 require the data. It may be that all data is sent to all MPs 13, 14, 15 if multiple MPs are provided for load balancing purposes. It is also possible, as described above, for different categories of data (e.g. temperature readings, light readings and so on) to be sent to different MPs 13, 14, 15 depending on the sort of data that each MP 13, 14, 15 handles. For example, the MPP may receive two sets of data from the device 1. The first set of data (e.g. data relating to a temperature measurement) is sent to an MP 13 that handles such data, and a second set of data (e.g. data relating to a humidity measurement) is sent to an MP 14 that handles such data.

S11. The MPP 9 sends the data to the relevant MPs 13, 14, 15.

S12. Applications 4, 5, 6 can now query the MPs 13, 14, 15 for the required data. They know which MP to contact because this information is provisioned at the RDs 10, 11, 12.

While the embodiments described above show the RDP 8 and the MPP as being co-located at a RCSF 7, it will be appreciated that they could similarly be located at different nodes or points in the network. Furthermore, the Figures and description refer to a single device 1. It will be appreciated that a typical network will contain many such devices 1, but only one is shown for clarity.

Figure 4:
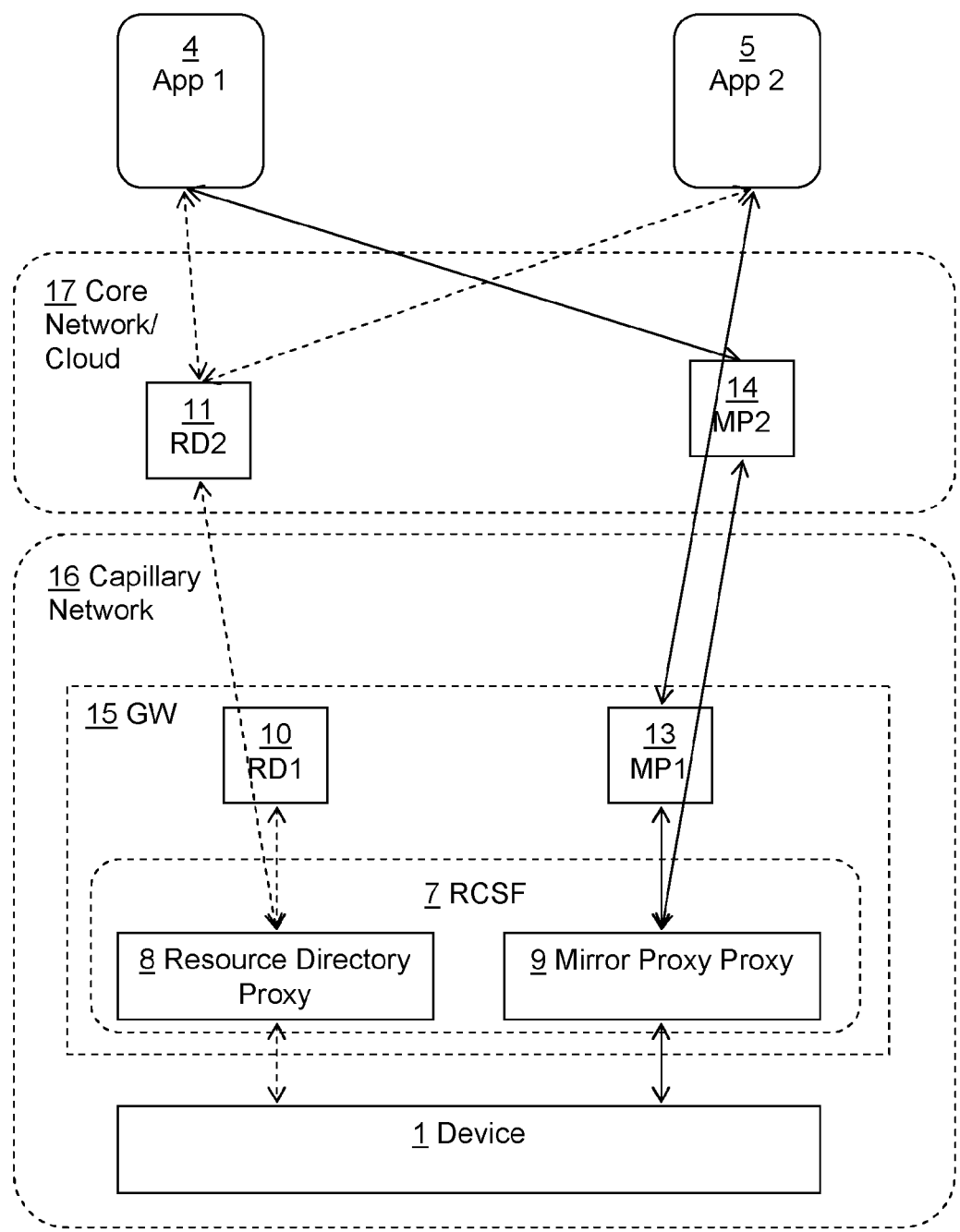
FIG. 4 illustrates schematically in a block diagram an exemplary capillary communications network using proxy nodes.

FIG. 4 shows an exemplary RCSF 7 in a communication network. In this exemplary scenario, the device 1 is connected via a gateway (GVV) 15 in a capillary network 16 to a Long Term Evolution (LTE) Core network 17. For the purposes of fault tolerance and local application operation, the GW 15 comprises the RDP 8 and the MPP 9. A RD 10 and a MP 13 are located in the capillary network 16. A further RD 11 and a further MP 13 are located in the core network 17 in order to capture the resource registrations and data from multiple capillary networks 16. Note that in FIG. 4, the RD 10 and the MP 13 are illustrated as being located at the GW 16, but it will be appreciated that they may be located at any suitable node in the capillary.

The RDP 8 and MPP 9 are used on behalf of each device 1 to offload the multiple registrations to the two RDs 10, 11 and to send data towards the two MPs 13, 14. The RDP 8 and the MPP 9 at the GW 15 are addressed by each device 1 in terms of IETF CoRE resources as coap://GW_IPv6_Address/rdp, coap://GW_IPv6_Address/mpp. The device 1 can issue Constrained Application Protocol (CoAP) requests to both the RDP 8 and the MPP 9 as soon as they are part of the IPv6 network, i.e. as soon as they discover the IPv6 address of the GW 15 through lower layers (e.g. RPL). It will be realised that the RDP 8 and the RD 10 in the capillary network 16 can be co-located as a single function provided by the GW 15 with a single entry point, coap://GW_IPv6_Address/rd i.e. the RD 10 resource or all RDP 8, RD 10 and MPP 9 resources could appear as a single resource coap://GW_IPv6_Address/rcsf.

Applications 4, 5 can query the RDs 10, 11 and MPs 13, 14 as necessary and depending on the information they receive. For the applications 4, 5 the network appears as normal, but for the device 1 only one registration is necessary even to register with multiple RDs, and only one set of data need be sent to the MPP 9 instead of sending multiple sets of data to multiple MPs.

Figure 5:
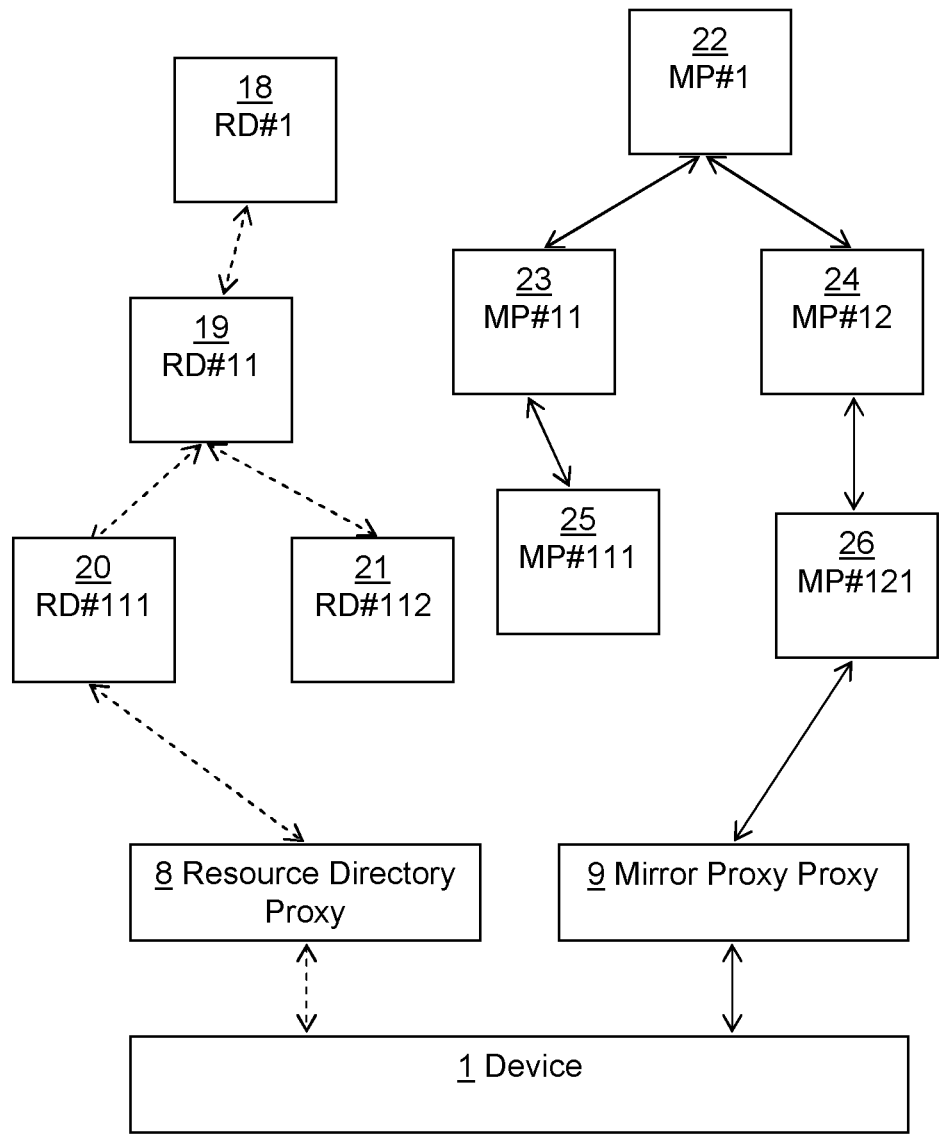
FIG. 5 illustrates schematically in a block diagram an exemplary communications network using a tree structure.

Turning now to FIG. 5, the RDP 8 and the MPP 9 in this exemplary network architecture are used as entry points for a hierarchical organization of multiple RDs 18, 19, 20, 21 and multiple MPs 22, 23, 24, 25, 26 in a tree structure. The parent RD 18 is a meta RD and contains pointers to children RDs 19, 20, 21. This can be used to allow the RD organization to be structured in a geographical fashion using location information. A parent MP 22 contains pointers to children MPs 23, 24, 25, 26, which can act as basic resources and publish device data to their parent MPs in a different frequency than their responsible device nodes. Furthermore, the parent MP 22 can aggregate data (for example over time and location) and take the role of new resources that publish the aggregated data to their parent MPs.

Figure 6:
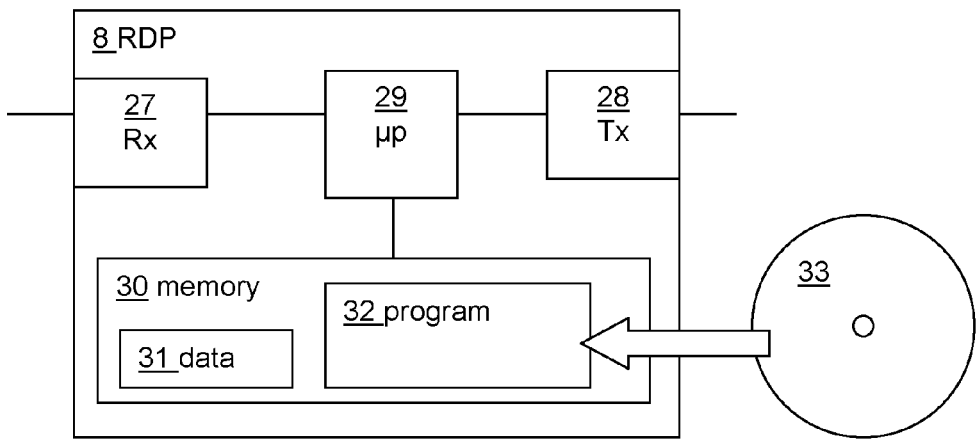
FIG. 6 illustrates schematically in a block diagram an exemplary Resource Directory Proxy node.

FIG. 6 illustrates schematically an exemplary RDP 8. The RDP 8 is provided with a receiver 27 for receiving a message from the device 1 that includes information about changes to resources available at the device 1. A transmitter 28 is provided for sending this information on to a RD node 10. Note that the transmitter 27 and receiver 29 may be embodied in a single transceiver interface or may be separate. In an embodiment, the receiver 27 is further arranged to receive a message from the device 1 that identifies the device 1 and includes information identifying resources available at the device. In this case the transmitter 28 may send a message identifying the device 1 and the available resources to one or more RDs 10, 11, 12.

A processor 29 is also provided for controlling operation of the device. A non-transitory computer-readable medium in the form of a memory 30 may also be provided. The memory may be used to store data 31 relating to the operation of the RDP 8 and the device 1. The memory 30 may also be used to store a program 32 which, when executed by the processor 29, causes the RDP 8 to behave as described above. Note that the computer program 32 may be obtained from a further non-transitory computer-readable medium in the form of a carrier medium 33 such as a flash drive or Compact Disk.

Figure 7:
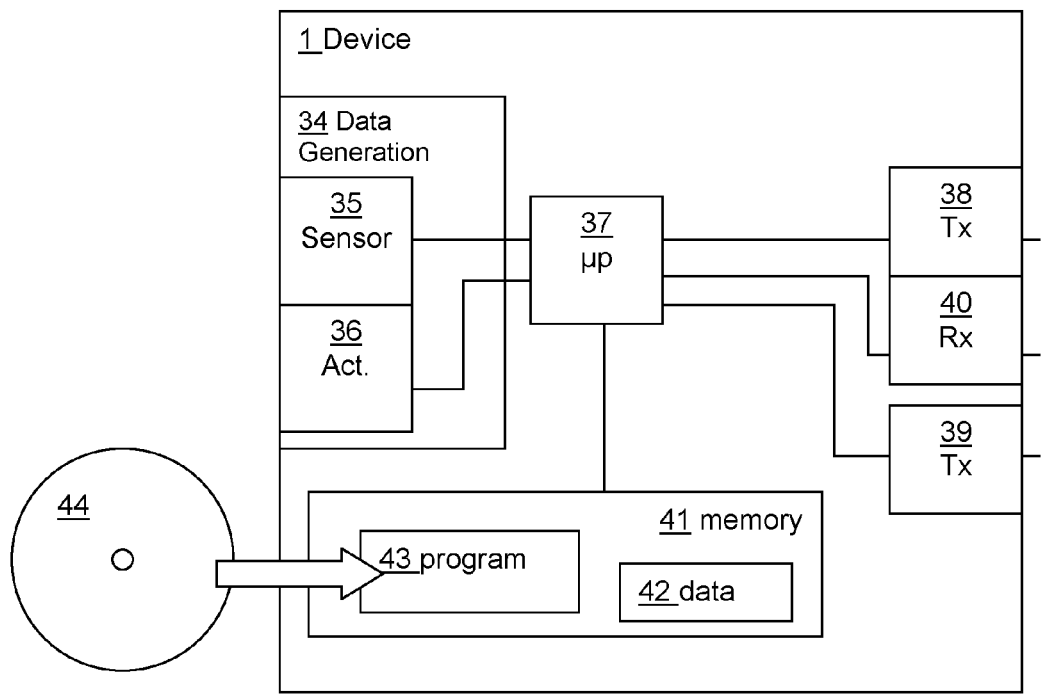
FIG. 7 illustrates schematically in a block diagram an exemplary device for communicating with the Resource Directory Proxy node.

FIG. 7 illustrates schematically an exemplary client device 1. The device is provided with a data generating unit 34 such as a sensor 35 or actuator 36 for obtaining data. A processor 37 collects data from the data generating unit 34, and a first transmitter 38 is provided for sending a first message to the RDP 8, the first message identifying the device 1 and including information identifying either/or resources available and changes to at least one of the resources. Note that the first message may be sent before, after or in parallel with obtaining data. This information can be subsequently sent from the RDP 8 to the RD 10 (or further RDs). A second transmitter 39 is provided for sending to the MPP node 9 at least a portion of the data collected by the processor 37, enabling the MPP 9 to make the data available to at least one Mirror Proxy node.

The client device 1 may be provided with a receiver 40 for receiving a presence request message from the RDP 8 to determine the availability of the device.

Note that the transmitters and receivers described above may be embodied separately or as one or more transceivers or other interfaces for communicating with other nodes. A non-transitory computer-readable medium in the form of a memory 41 may also be provided. The memory may be used to store data 42 relating to the operation of the device 1 and obtained from the data generating unit 34. The memory 41 may also be used to store a program 43 which, when executed by the processor 37, causes the device 1 to behave as described above. Note that the computer program 42 may be obtained from a further non-transitory computer-readable medium in the form of a carrier medium 44 such as a flash drive or Compact Disk.

Figure 8:
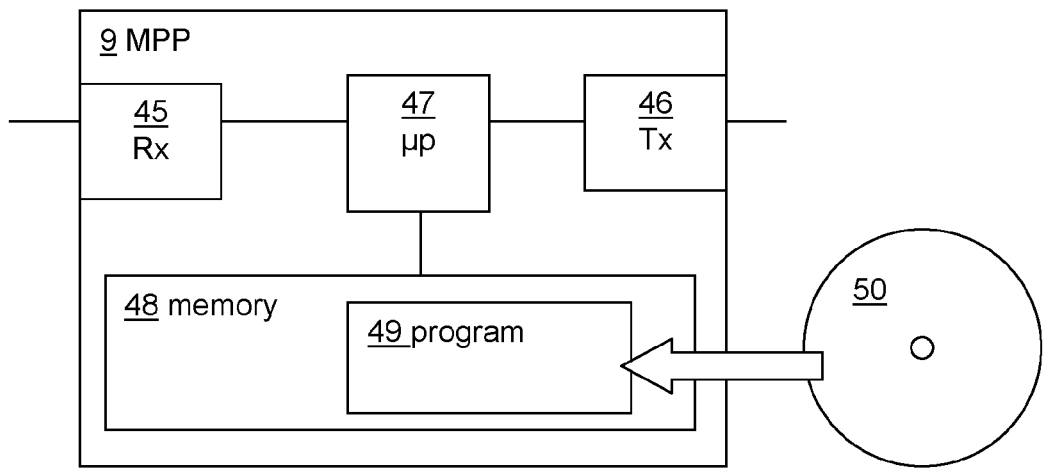
FIG. 8 illustrates schematically in a block diagram an exemplary Mirror Proxy Proxy node.

FIG. 8 illustrates schematically an exemplary MPP 9, which is provided with a receiver 45 for receiving from the device 1 a data message. The data message includes the identity of the device 1 and data obtained by the device 1. A transmitter 46 is also provided for sending to a MP 13 a further data message that includes the identity of the device 1 and the data obtained by the device 1. As described above, the transmitter 46 may send the further data message to a set of MPs 13, 14, 15. Note that the transmitters and receivers described above may be embodied separately or as one or more transceivers or other interfaces for communicating with other nodes. A processor 47 is provided for selecting the MP 13 from the set of MPs 13, 14, 15.

The receiver 45 may be arranged to receive from the device 1 a plurality of sets of data. In this case, the processor 47 is arranged to, for each set of data of the plurality of sets of data, determine an identity of a MPP 13 to receive the set of data. In this case, the transmitter 46 is arranged to send the set of data to the determined MP 13.

A non-transitory computer-readable medium in the form of a memory 48 may be provided. The memory 48 may be used to store a program 49 which, when executed by the processor 47, causes the MPP 9 to behave as described above. Note that the computer program 49 may be obtained from a further non-transitory computer-readable medium in the form of a carrier medium 50 such as a flash drive or Compact Disk.

Figure 9:
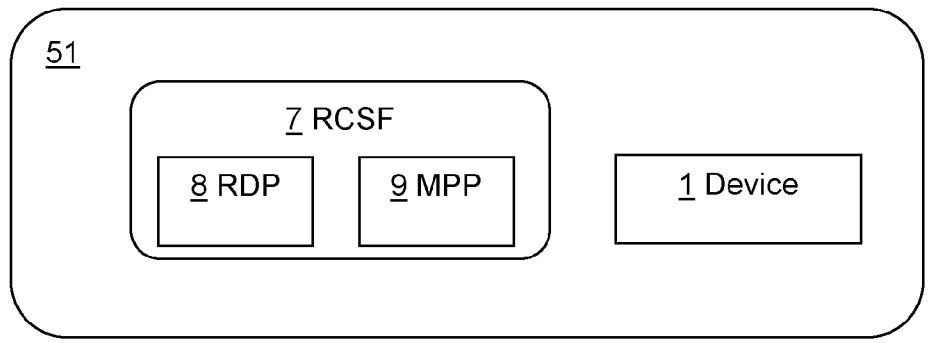
FIG. 9 illustrates schematically in a block diagram an exemplary vessel or vehicle.

FIG. 9 illustrates schematically a vessel or vehicle 51 such as a ship, a car, a truck or a train. The vessel or vehicle 51 may be provided with any of an RCSF comprising an RDP 8 and/or an MPP 9 as described above, and a device 1 as described above.

It will be appreciated by the person of skill in the art that various modifications may be made to the above described embodiment without departing from the scope of the present invention. For example, the functions of the various nodes are described as embodied at a single node, but it will be appreciated that different functions may be provided at different network nodes.

The following abbreviations have been used in this application:
3GPP 3$^{rd}$ Generation Partnership Project
CoAP Constrained Application Protocol
CoRE Constrained RESTful Environments
DoS Denial of Service
GW Gateway
IETF Internet Engineering Task Force
LTE Long Term Evolution
M2M Machine to Machine
MP Mirror Proxy
MPP Mirror Proxy Proxy
RCSF Registration and Caching Support Function
RD Resource Directory
RDP Resource Directory Proxy

The invention claimed is:

1. A method of identifying resources available at a device in a communication network, the method comprising, at the device:
   sending to a Resource Directory Proxy node a first message, the first message identifying the device and including information identifying changes to at least one resource available at the device, the information to be sent from the Resource Directory Proxy node to at least one Resource Directory node selected from a set of Resource Directory nodes; and
   sending to a Mirror Proxy Proxy node data relating to at least one of the resources available at the device, enabling the Mirror Proxy Proxy node to make the data available to at least one Mirror Proxy node.

2. A Resource Directory Proxy node for use in a communication network, the Resource Directory Proxy node comprising:
   a receiver for receiving from a device a first message, the first message relating to a change in at least one resource available at the device;
   a processor for selecting, from a set of Resource Directory nodes a Resource Directory node associated with the device; and
   a transmitter for sending to the selected Resource Directory node a second message including the change in the at least one resource available at the device;
   wherein the receiver is further arranged to receive from the device a third message, the third message identifying the device and including information identifying resources available, and the transmitter is arranged to send to the Resource Directory node a fourth message, the fourth message identifying the device and the available resources.

3. The Resource Directory Proxy node according to claim 2, wherein the transmitter is arranged to send a fifth message to a further Resource Directory node, the fifth message identifying the device and at least a part of the available resources.

4. A Resource Directory Proxy node for use in a communication network, the Resource Directory Proxy node comprising:
   a receiver for receiving from a device a first message, the first message relating to a change in at least one resource available at the device;
   a processor for selecting, from a set of Resource Directory nodes a Resource Directory node associated with the device; and
   a transmitter for sending to the selected Resource Directory node a second message including the change in the at least one resource available at the device;

wherein the transmitter is arranged to send in the second message an identity of at least one Mirror Proxy Proxy node to which the device sends data.

* * * * *